United States Patent
Chang et al.

(10) Patent No.: US 9,131,334 B2
(45) Date of Patent: Sep. 8, 2015

(54) METHOD AND SYSTEM FOR BLUETOOTH COMMUNICATION

(75) Inventors: Sokho Chang, Gyeonggi-do (KR); Sameui Kwon, Seoul (KR); Seokwon Lee, Seoul (KR); Choonghwan Yi, Anyang-si (KR); Jinwoo Park, Gwanglu-si (KR)

(73) Assignee: BC CARD CO., LTD., Seoul (KR)

( * ) Notice: Subject to any disclaimer, the term of this patent is extended or adjusted under 35 U.S.C. 154(b) by 246 days.

(21) Appl. No.: 13/821,316

(22) PCT Filed: Sep. 7, 2011

(86) PCT No.: PCT/KR2011/006618
§ 371 (c)(1),
(2), (4) Date: Jul. 17, 2013

(87) PCT Pub. No.: WO2012/033340
PCT Pub. Date: Mar. 15, 2012

(65) Prior Publication Data
US 2013/0288604 A1    Oct. 31, 2013

(30) Foreign Application Priority Data
Sep. 7, 2010  (KR) .................. 10-2010-0087650

(51) Int. Cl.
| H04B 7/00 | (2006.01) |
| H04W 4/00 | (2009.01) |
| H04W 84/18 | (2009.01) |
| G06Q 30/02 | (2012.01) |
| H04W 76/02 | (2009.01) |
| H04W 4/02 | (2009.01) |

(52) U.S. Cl.
CPC .............. *H04W 4/008* (2013.01); *G06Q 30/02* (2013.01); *H04W 4/00* (2013.01); *H04W 84/18* (2013.01); *H04W 4/02* (2013.01); *H04W 76/023* (2013.01)

(58) Field of Classification Search
CPC ...................................... H04W 4/008
USPC ................................. 455/41.1, 41.2
See application file for complete search history.

(56) References Cited

U.S. PATENT DOCUMENTS
| 8,886,118 | B2 * | 11/2014 | Reuss et al. | .................. 455/41.1 |
| 2004/0192206 | A1 | 9/2004 | Hirvonen | |
| 2009/0176520 | A1 * | 7/2009 | B. S. et al. | .................... 455/466 |

FOREIGN PATENT DOCUMENTS
| KR | 20060001024 A | 1/2006 |
| KR | 20080058873 A | 6/2008 |
| KR | 20090124588 A | 12/2009 |

* cited by examiner

*Primary Examiner* — Tuan H Nguyen
(74) *Attorney, Agent, or Firm* — Bacon & Thomas, PLLC

(57) ABSTRACT

Disclosed are a Bluetooth communication method and system which enable a Bluetooth device to be connected to other terminals without a pairing process and data to be transmitted through Bluetooth communication when the Bluetooth device is paired with any of a plurality of terminals having the same device information. The Bluetooth communication method includes receiving, by a receiving unit in a central communication server, communication information from a first terminal when the first terminal and a Bluetooth device are paired, transmitting, by a transmitting unit in the central communication server, the communication information to a second terminal having the same device information as the first terminal, and establishing, by the second terminal, a communication channel with the Bluetooth device, without the pairing process, on the basis of the received communication information.

14 Claims, 5 Drawing Sheets

FIRST TERMINAL

Bluetooth Link

BLUETOOTH DEVICE

SECOND TERMINAL

Bluetooth Link

BLUETOOTH DEVICE

N<sup>TH</sup> TERMINAL

Bluetooth Link

BLUETOOTH DEVICE

METHOD AND SYSTEM FOR BLUETOOTH COMMUNICATION

CLAIM FOR PRIORITY

This application claims priority to Korean Patent Application No. 2010-0087650 filed on Sep. 7, 2010 in the Korean Intellectual Property Office (KIPO), the entire contents of which are hereby incorporated by reference.

BACKGROUND

1. Technical Field

The present invention relates to a method and system for Bluetooth communication between a Bluetooth device and a plurality of terminals for supporting a Bluetooth function.

2. Related Art

Bluetooth technology replaces multiple cable connections which are required between devices with a single wireless connection within a local area. For example, when Bluetooth wireless technology is implemented in a mobile phone and a laptop computer, the mobile phone and the laptop computer may be used while connected without a cable. Actually all types of digital devices including printers, personal digital assistants (PDAs), desktop computers, fax machines, keyboards, and joysticks may be a part of a Bluetooth system. The Bluetooth wireless technology allows devices to be free from cables, and acts as a universal bridge for forming an interface between an existing data network and peripheral devices, and a particular group between devices spaced apart from a fixed network lower structure. Bluetooth has been designed to be operated even in a radio frequency environment with much noise, and therefore Bluetooth ensures connection using rapid recognition and a frequency hopping method. A Bluetooth module performs new frequency hopping after receiving or sending a packet, thereby avoiding interference with other signals. Compared to other systems which are operated in the same frequency, Bluetooth uses particularly fast and short packets. Hereinafter, a communication method using Bluetooth will be briefly described.

A Bluetooth device that enables intercommunication by a Bluetooth communication method configures a connection state in which communication is performed by performing an operation such as inquiry, inquiry scan, page, page scan, or the like. In this process, a master device and a slave device are determined depending on their roles.

When configuring a new connection state between the Bluetooth devices, an operation clock and a frequency pattern between the Bluetooth devices should be aligned. Inquiry among processes performed to configure the connection state in this manner refers to a process in which a master device repeatedly sends an operating frequency so that a slave device aligns a frequency pattern with that of the master device. Inquiry scan refers to a process which is performed in the slave device, in which a received frequency is detected and synchronization is aligned with the detected frequency. Page refers to a process in which the master device sends a clock signal so that the slave devices are aligned with an operating clock of the master device, and page scan refers to a process in which the slave device detects a received clock and aligns synchronization. A network that is formed in such a manner that at least one slave devices configures a connection state with respect to the master device through these processes is referred to as a piconet.

According to the Bluetooth communication method currently proposed, a single master device in a piconet connects seven slave devices in an active state so that the seven slave devices may perform intercommunication. In addition, in order to connect a new slave device to the piconet, the master device releases the connection in the active state with respect to any one slave device among the seven slave devices which are connected in the active state, and performs communication connection of the active state with the new slave device.

Meanwhile, in the Bluetooth communication method, the master device and the slave device are operated in an active mode for performing normal communication with the slave device and in hold/sniff/park/modes for saving power of a communication device. The hold mode is a typical mode used when there is no need to send data for a relatively long time. The sniff mode is a mode for transmitting and receiving data for a predetermined period of time starting from a specific time that is set between the master device and the slave device. The park mode is a mode for intermittently performing communication between the master device and the slave device so that the slave devices requests to maintain synchronization with the master device and requests switch to the active mode.

The slave device that is operated in any one among the active mode and the hold/sniff/park modes repeatedly performs an operation of a corresponding mode with a predetermined period. Meanwhile, an operation of the slave device operated in the hold mode may be regarded as a periodic operation such as in other modes because the slave device with a fixed time should wake up so as to perform communication with the master device even though the hold mode is a one-time operation mode without a repetitive period.

In this instance, when the slave device connected to the master device is converted into a corresponding mode, the master device sets a communication allocation time with each slave device in the corresponding mode through communication negotiation with the slave device whose mode is to be converted. These slave devices are set so as to be operated with periodicity with respect to the corresponding mode through negotiation with the master device. Accordingly, in the related art, the master device and the slave device may fixedly perform communication with communication allocation time and period set by mutual negotiation before a mode of the slave device is changed.

Meanwhile, for the Bluetooth communication, a pairing process between the Bluetooth devices must be performed first. However, the fact that the pairing process is newly performed every time between new Bluetooth devices may be very inconvenient for users.

Therefore, there is a need to introduce a Bluetooth communication system capable of omitting the pairing process.

SUMMARY

Accordingly, example embodiments of the present invention are provided to substantially obviate one or more problems due to limitations and disadvantages of the related art.

Example embodiments of the present invention provide a Bluetooth communication method and system, which enable a Bluetooth device to be connected to other terminals without a pairing process and then communicate data through Bluetooth communication when the Bluetooth device is paired with any of a plurality of terminals having the same device information.

In some example embodiments, a Bluetooth communication method includes: receiving, by a receiving unit in a central communication server, communication information from a first terminal when the first terminal and a Bluetooth device are paired; transmitting, by a transmitting unit in the central communication server, the communication information to a second terminal having the same device information as the first terminal; and establishing, by the second terminal, a communication channel with the Bluetooth device, without the pairing process, on the basis of the received communication information.

In other example embodiments, a Bluetooth communication system includes: a central communication server that includes a receiving unit for receiving communication information from a first terminal when the first terminal and a Bluetooth device are paired, a transmitting unit for transmitting the communication information to a second terminal having the same device information as the first terminal, a database for storing the communication information, and a control unit for controlling the receiving unit, the transmitting unit, and the database; and a second terminal that establishes a communication channel with the Bluetooth device, without the pairing process, on the basis of the received communication information.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Terms used in the present invention will be briefly described, and the present invention will be described in detail.

The terms used in the present invention are selected as general terms used currently as widely as possible, but in specific cases, terms arbitrarily selected by the applicant are also used, and in such cases the meanings are mentioned in the corresponding detailed description section, so the present invention should be understood not by literal meanings of the terms but by given meanings of the terms.

"Pairing" throughout the specification denotes a state of allowing mutual communication connection between devices for supporting Bluetooth function.

Throughout the specification, when any part "comprises" any components, this is not intended to exclude any other components, and other components may be further included unless specifically described otherwise. The terms "unit," "-er(-or)," "module," and the like, described in the specification refer to units for performing at least one function or operation and can be embodied by hardware, by software, or by a combination of hardware and software.

Hereinafter, exemplary embodiments of the present invention will be described in detail with reference to the accompanying drawings so that a person skilled in the art can readily carry out the invention. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Figure 1:
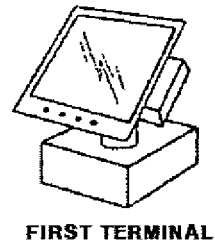
FIG. 1 is a drawing showing a general Bluetooth communication system according to an embodiment of the present invention.
Figure 1:
Figure 1:
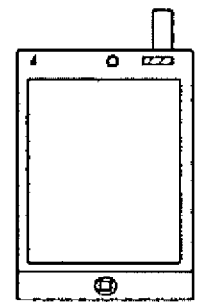
Figure 1:
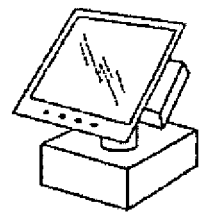
Figure 1:
Figure 1:
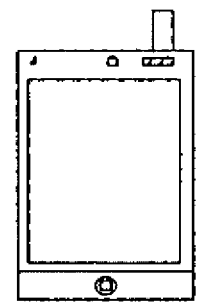
Figure 1:
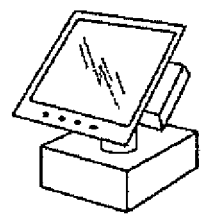
Figure 1:
Figure 1:
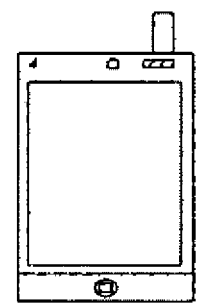

FIG. 1 is a drawing showing a general Bluetooth communication system according to an embodiment of the present invention. As shown in FIG. 1, according to a general Bluetooth communication system, a first terminal, a second terminal, . . . , and an $n^{th}$ terminal should be respectively subjected to a pairing process with a Bluetooth device so that mutual Bluetooth communication can be realized. However, according to an embodiment of the present invention, when only the first terminal is paired with the Bluetooth device, Bluetooth communication with the Bluetooth device may be enabled for other terminals.

The pairing process is performed as follows.

First, a master device searches for a nearby Bluetooth device. In this case, the master device receives production information from the Bluetooth device that allows the search. In the production information, a Bluetooth device (BD) address, a product name, a profile, and the like may be included.

The profile is a standard that defines how to use Bluetooth in the top-level application. As the profile, a cordless telephony profile, an intercom profile, a serial port profile, a headset profile, a dial-up networking profile (modem), a fax profile, a LAN access profile (router), an object push profile (business card exchange), a file transfer profile (file transmission other than PC), a synchronization profile (promoting synchronization other than PC), and the like may be used.

The master device selects a Bluetooth device desiring connection from among the searched Bluetooth devices, and then requests pairing. In this case, the Bluetooth device that receives the request for the pairing transmits personal identification information to the master device. As an example of the personal identification information, a personal identification number (PIN) may be given. The personal identification information may be generated for one-time use, or set in advance.

When the personal identification information requested by the master device coincides with personal identification information received from the Bluetooth device, pairing between the master device and the Bluetooth device is completed.

When the pairing is successful, a random operation is performed using the BD address of the master device and the Bluetooth device, and then a link key may be generated. For example, the link key may be 128 bits. The link key may be stored in the master device and the Bluetooth device. Accordingly, the master device and the Bluetooth device which have been subjected to the pairing once may be connected with each other through the link key without the pairing process at the time of next connection.

Hereinafter, a Bluetooth communication system that enables Bluetooth communication with the other terminals without the pairing when any one among a plurality of terminals having the same device information and a Bluetooth device are paired will be described in detail with reference to FIG. 2.

Figure 2:
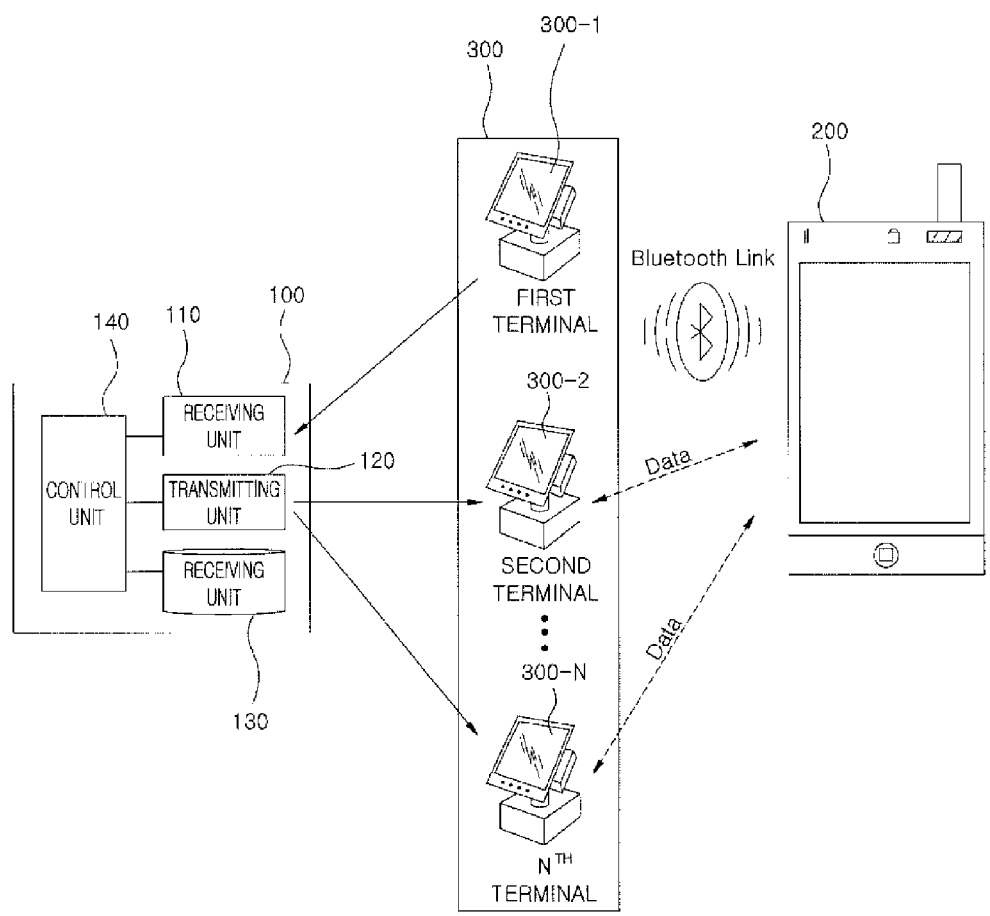
FIG. 2 is a drawing for describing a Bluetooth communication system according to an embodiment of the present invention.

As shown in FIG. 2, according to an embodiment of the present invention, the Bluetooth communication system may include a central communication server 100, a Bluetooth device 200, and a plurality of terminals 300 having the same device information. The central communication server 100 and the plurality of terminals 300 may be connected to a wired/wireless communication network. In addition, the Bluetooth device 200 and the plurality of terminals 300 may be connected in Bluetooth communication.

The central communication server 100 may perform relay so that the Bluetooth device 200 can perform Bluetooth communication with the plurality of terminals 300. The central communication server 100 may include a receiving unit 110, a transmitting unit 120, a database 130, and a control unit 140.

According to an embodiment of the present invention, the central communication server 100 may receive the communication information, advertising data, and the like through the receiving unit 110. The central communication server 100 may transmit the communication information and advertising data to the plurality of terminals 300 through the transmitting unit 120.

The communication information and the advertising data may be stored in the database 130. The control unit 140 may generally control the receiving unit 110, the transmitting unit 120, and the database 130.

According to an embodiment of the present invention, the Bluetooth device 200 refers to a device that supports a Bluetooth function. The Bluetooth device 200 may include a mobile terminal. The mobile terminal may be embodied in a variety of forms. For example, as the mobile terminal described in the present specification, a cellular phone, a smart phone, a personal digital assistant (PDA), a portable multimedia player (PMP), a navigation terminal, an e-book terminal, and the like may be used.

The Bluetooth device 200 may include a wireless communication unit, a memory, a user input unit, an output unit, and a control unit. Hereinafter, the above-described components will be described. The wireless communication unit may include at least one component that enables wireless communication between the Bluetooth device 200 and a wireless communication system and wireless communication between the Bluetooth device 200 and a network in which the Bluetooth device 200 is located. For example, the wireless communication unit may include a mobile communication module, a wireless Internet module, a local area communication module, a position information module, and the like.

The mobile communication module may transmit and receive wireless signals with at least one of a base station on a mobile communication network, an external terminal, and a server. Here, the wireless signals may include audio signals, video communication call signals, or a variety of data according to character/multimedia message transmission/reception.

The wireless Internet module refers to a module for wireless Internet connection, and may be internally or externally mounted. The local area communication module refers to a module for local area communication. As local area communication technology, Bluetooth, radio frequency identification (RFID), Infrared Data Association (IrDA), ultra wideband (UWB), Zigbee, near field communication, and the like may be used.

In addition, the position information module refers to a module for confirming or obtaining a position of the Bluetooth device 200. An example of the position information module is a Global Positioning System (GPS) module. The GPS module receives position information from a plurality of satellites.

The memory may store a program for processing and controlling the control unit, and perform a function for arbitrary storage of input/output data. For example, the memory may store the link key and the received advertising data.

The user input unit generates input data used for controlling an operation of the Bluetooth device 200 by a user. The output unit may be used for output of audio signals, video signals, or alarm signals, and include a display unit, an acoustic output module, an alarm unit, and the like. The display unit displays and outputs information processed in the Bluetooth device 200.

The control unit typically controls overall operations of the Bluetooth device 200. Accordingly, according to an embodiment of the present invention, the control unit may control the wireless communication unit, the memory, the user input unit, and the output unit.

According to an embodiment of the present invention, the plurality of terminals 300 may have the same device information. The plurality of terminals 300 may include a first terminal 300-1, a second terminal 300-2, ..., and an $N^{th}$ terminal 300-N. For the convenience of description, a terminal that is subjected to the pairing process with the Bluetooth device 200 is referred to as the first terminal 300-1, and a terminal that performs Bluetooth communication with the Bluetooth device 200 without the pairing process is referred to as the second terminal 300-2. That is, the second terminal 300-2 may represent the remaining terminals 300-2, ..., and 300-N excluding the first terminal 300-1.

According to an embodiment of the present invention, the plurality of terminals 300 may be terminals of an affiliated store and terminals of a kiosk. The terminals of the affiliated store may be implemented through credit authorization terminal (CAT), point of sale (POS), and the like. The POS is a system that registers sales in real-time and enables automatic settlement and aggregation of the registered sales to thereby improve efficiency of store operation.

The kiosk refers to a computer automation system that is provided in public places for the purpose of convenience of customers. An example of the kiosk is an information-search terminal that provides advertisements and information.

Hereinafter, a configuration of the plurality of terminals 300 including the first terminal 300-1 and the second terminal 300-2 will be described in detail with reference to FIG. 3.

Figure 3:
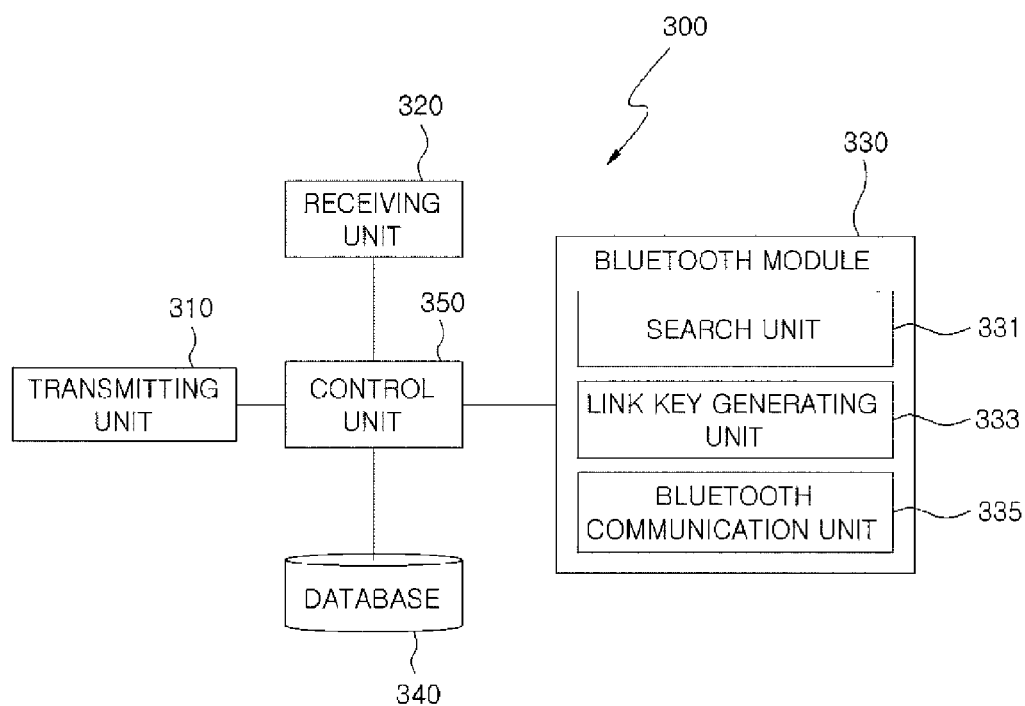
FIG. 3 is a block diagram showing a plurality of terminals having the same device information according to an embodiment of the present invention.

As shown in FIG. 3, according to an embodiment of the present invention, the plurality of terminals 300 may include a transmitting unit 310, a receiving unit 320, a Bluetooth module 330, a database 340, and a control unit 350.

According to an embodiment of the present invention, when any one of the plurality of terminals 300 is paired with the Bluetooth device 200, the paired terminal 300-1 may transmit communication information to the central communication server 100 through the transmitting unit 310.

The receiving unit 320 may receive personal identification information (for example, a PIN code) input by a user, on the basis of a request for the pairing from the Bluetooth device 200. In addition, the receiving unit 320 may receive the communication information from the central communication server 100. The receiving unit 320 may receive advertising data from the central communication server 100.

Meanwhile, the Bluetooth module 330 may include a search unit 331, a link key generating unit 333, and a Bluetooth communication unit 335.

The search unit may search for a nearby Bluetooth device, and request pairing (PIN code input request) from the Bluetooth device 200 that allows the search.

The link key generating unit 333 may generate a link key using the Bluetooth address of the Bluetooth device 200 which the receiving unit 320 has received and the Bluetooth address of the paired terminal 300-1.

The Bluetooth communication unit 335 may transmit and receive data through Bluetooth communication with the Bluetooth device 200. For example, the Bluetooth communication unit 335 may transmit, to the Bluetooth device 200, the advertising data that the receiving unit 320 has received from the central communication server 100, using Bluetooth communication.

According to an embodiment of the present invention, the received communication information, the link key, and the advertising data may be stored in the database 340.

The control unit 350 may generally control the transmitting unit 310, the receiving unit 320, the Bluetooth module 330, and the database 340. In addition, the control unit 350 may generate the personal identification information (for example, PIN code).

Hereinafter, using the configuration of the Bluetooth communication system, a Bluetooth communication method in which the second terminal 300-2 is connected with the Bluetooth device 200 without a pairing process when the first terminal 300-1 is paired with the Bluetooth device 200 will be described in detail.

Figure 4:
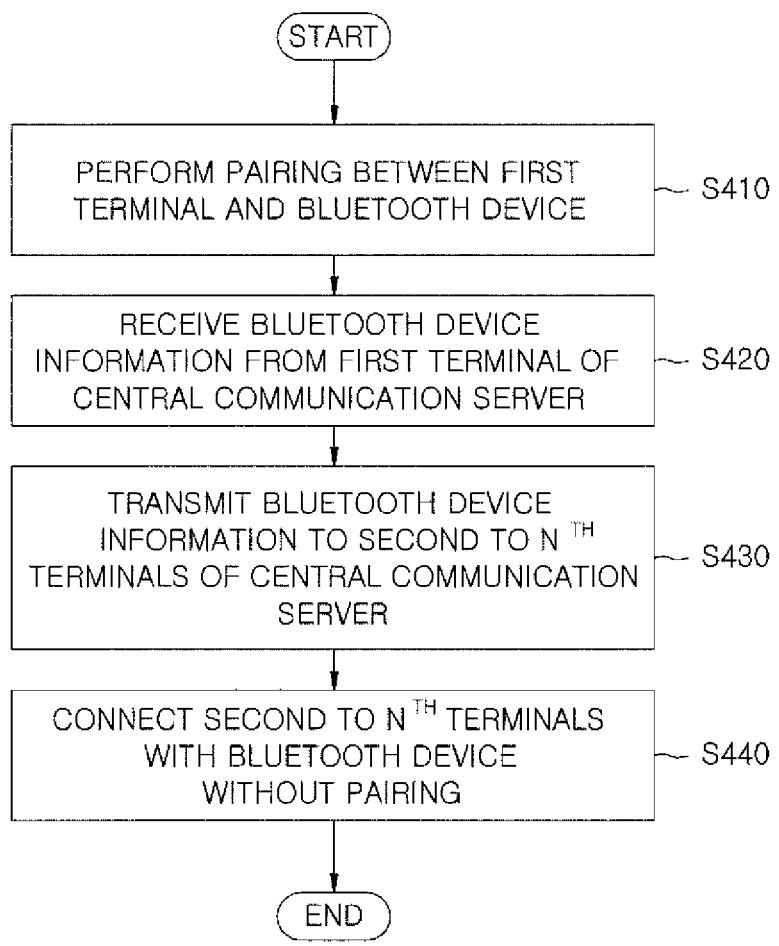
FIG. 4 is a flowchart for describing a Bluetooth communication method according to an embodiment of the present invention.

FIG. 4 is a flowchart for describing a Bluetooth communication method according to an embodiment of the present invention.

According to an embodiment of the present invention, in step S410, the first terminal 300-1 and the Bluetooth device 200 may perform a pairing process. The pairing process is the same as above. That is, the first terminal 300-1 may request pairing from the Bluetooth device 200. This may include the first terminal 300-1 requesting input of personal identification information from the Bluetooth device 200.

When a user of the Bluetooth device 200 inputs the personal identification information, the first terminal 300-1 may receive the personal identification information from the Bluetooth device 200. The first terminal 300-1 may be subjected to authentication for the personal identification information, and then may generate a link key using a BD address of the first terminal 300-1 and the Bluetooth device 200. In this case, the link key may be stored in the memory of the first terminal 300-1 and the Bluetooth device 200.

According to an embodiment of the present invention, in step S420, when the first terminal 300-1 and the Bluetooth device 200 are paired, the receiving unit 110 of the central communication server 100 may receive communication information from the first terminal 300-1. A BD address, a link key, and the like may be included in the communication information.

According to an embodiment of the present invention, in step S430, the transmitting unit 120 of the central communication server 100 may transmit the communication information (for example, BD address or link key) to the second terminal 300-2 having the same device information as the first terminal 300-1.

The BD address, a product name, and the like may be included in the device information. That is, the first terminal 300-1 and the second terminal 300-2 may have the same BD address, and the same product name.

Accordingly, in step S440, the second terminal that has received the communication information may establish a communication channel without the pairing process with the Bluetooth device 200 on the basis of the received communication information. The second terminal 300-2 has the same BD address and product name as the first terminal 300-1, and does not need to be subjected to the pairing process with the Bluetooth device 200 because the second terminal 300-2 has the link key information received from the central communication server 100.

"Establishing the communication channel" may mean that the second terminal 300-2 is able to transmit and receive data to and from the Bluetooth device 200 through Bluetooth communication.

According to an embodiment of the present invention, any of the terminals 300-1, . . . , and 300-N may transmit data to the Bluetooth device that has been paired with any one of the plurality of terminals 300, that is, the first terminal 300-1, the second terminal 300-2, . . . , and the $N^{th}$ terminal 300-N, and therefore each of the plurality of terminals may transmit data to a variety of Bluetooth devices other than the Bluetooth device that has been subjected to the pairing process.

Therefore, according to an embodiment of the present invention, the second terminal 300-2 and the Bluetooth device 200 may omit the inconvenient pairing process, thereby providing convenience of use to users.

According to a first embodiment of the present invention, the device information may be divided in accordance with a sales group. For example, it is assumed that first to sixth terminals are terminals of a coffee shop, and seventh to tenth terminals are terminals of a gimbap shop. In this case, a BD address of the first to sixth terminals that are the terminals of the coffee shop may be 12345, and a BD address of the seventh to tenth terminals that are the terminals of the gimbap shop may be 67890. That is, the "first to sixth terminals" and the "seventh to tenth terminals" may have different device information.

Accordingly, when the first terminal is paired with the Bluetooth device 200, the second to sixth terminals having the same device information may able to perform Bluetooth communication with the Bluetooth device 200 without the pairing process, but the seventh to tenth terminals having different device information from the first terminal are able to perform Bluetooth communication only when any one of the seventh to tenth terminals is paired with the Bluetooth device 200.

According to a second embodiment of the present invention, the device information may be divided in accordance with a local group. For example, terminals (a to d terminals) of a coffee shop in Seocho-gu and terminals (e to h terminals) of a coffee shop in Gangdong-gu may have different device information. Accordingly, when the a terminal is paired with the Bluetooth device 200, the b to d terminals having the same device information are able to perform Bluetooth communication with the Bluetooth device 200 without the pairing process, but the e to h terminals having different device information from the a terminal are able to perform the Bluetooth communication only when any one of the e to h terminals is paired with the Bluetooth device 200.

That is, according to an embodiment of the present invention, the plurality of terminals 300 may be grouped in accordance with the sales group or the local group. This is because when the plurality of terminals 300 have different sales fields, or are spaced far apart from each other, efficiency of performing Bluetooth communication with the Bluetooth device 200 may be reduced.

Hereinafter, a method of transmitting advertising data to the Bluetooth device 200 using the Bluetooth communication system will be described in detail.

Figure 5:
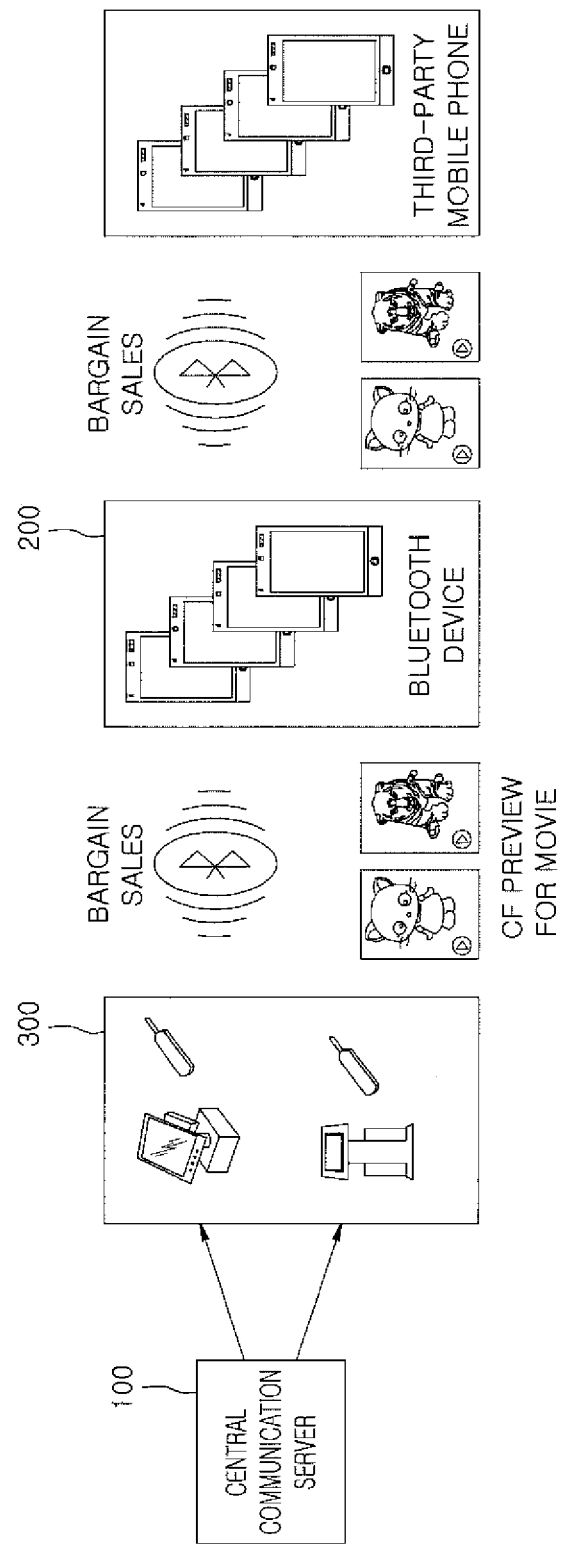
FIG. 5 is a drawing showing a method of transmitting advertising data using a Bluetooth communication system according to an embodiment of the present invention.

FIG. 5 is a drawing showing a method of transmitting advertising data using a Bluetooth communication system according to an embodiment of the present invention.

As shown in FIG. 5, according to an embodiment of the present invention, the central communication server may transmit advertising data to the first terminal 300-1 and the second terminal 300-2.

The adverting data may be advertising data that the central communication server 100 has received from an external advertisement providing server, or advertising data that has been generated or stored in the central communication server 100. The advertising data may include information about an affiliated store, coupon information, promotion information, and the like.

According to an embodiment of the present invention, the first terminal 300-1 and the second terminal 300-2 may transmit the received advertising data to the Bluetooth device 200. Thus, according to an embodiment of the present invention, even though the Bluetooth device 200 is paired only with the first terminal 300-1, the second terminal 300-2 having the same device information may transmit the advertising data to the Bluetooth device 200 which is not subjected to the pairing process.

Consequently, according to an embodiment of the present invention, any terminal 300-1, . . . , and 300-N may transmit data to the Bluetooth device that has been paired with any one the plurality of terminals 300, that is, the first terminal 300-1, the second terminal 300-2, . . . , and the $N^{th}$ terminal 300-N, and therefore each terminal may transmit the advertising data to a variety of Bluetooth device 200. Thus, when using the Bluetooth communication system according to an embodiment of the present invention, the advertising data may be effectively transmitted to the Bluetooth device 200.

For example, when the central communication server 100 transmits the preview for a movie to all of the plurality of terminals 300, it is assumed that the first terminal that has been paired with the Bluetooth device 200 is located at a distance at which Bluetooth communication with the Bluetooth device 200 is not able to be performed. In this case, the second terminal 300-2 which is located at a short distance from the Bluetooth device 200 may transmit the preview for the movie to the Bluetooth device 200. This is because the second terminal 300-2 has the same device information as the first terminal 300-1 and has a link key received from the central communication server 100.

In addition, according to an embodiment of the present invention, the plurality of terminals 300 may be grouped in accordance with the sales group or the local group. For example, terminals of a coffee shop may be grouped as one group, and the same device information (BD address) and a product name may be allocated to the terminals of the coffee shop. In addition, kiosks located in Bundang may be grouped as one group, and the same device information may be allocated to the kiosks.

In this case, the central communication server 100 may transmit the advertising information in accordance with the device information of the plurality of terminals 300. For example, the central communication server 100 may transmit, to a terminal group of a coffee shop, coffee discount coupons, latest coffee machine release information, coffee shop open events, and the like. In addition, the central communication server 100 may transmit, to a kiosk group located in Bundang, restaurant information for Bundang, geographic information for Bundang, tourist information for Bundang, and the like.

In this case, a user of the Bluetooth device 200 may receive advertising data associated with the first terminal 300-1 in which Bluetooth communication is allowed by the user himself. Thus, the user may receive efficient advertising data. In addition, the user may receive advertising data from terminals of a sales group or a local area involving the first terminal 300-1 in which the pairing process is allowed to be performed by the user, thereby preventing advertising data from being thoughtlessly transmitted to the Bluetooth device 200.

As described above, according to the embodiments of the present invention, when a Bluetooth device succeeds in paring with any one terminal among a plurality of terminals with the same ID information, the Bluetooth device may perform Bluetooth communication with the other terminals without a pairing process. Accordingly, inconvenience of a user that should perform the pairing process several times may be reduced.

In addition, according to the embodiments of the present invention, only when a single terminal succeeds in paring with the Bluetooth device, the single terminal may perform Bluetooth communication with the Bluetooth device using the other plurality of terminals, and therefore advertising data or the like may be transmitted through another nearby terminal even though the terminal that has been subjected to pairing and the Bluetooth device are spaced far apart from each other, which can be useful for advertisers.

According to an embodiment of the present invention, the above-described method may be implemented as a computer-readable code in a medium on which a program is recorded. A computer-readable medium includes all types of recording devices on which data that can be read by a computer system is stored. Examples of the computer-readable medium include a ROM, a RAM, a CD-ROM, a magnetic tape, a floppy disk, an optical data storage device, or the like, as well as a device that is implemented in the form of carrier waves (for example, transmission through the Internet). In addition, the computer may include a control unit of a mobile terminal.

While the example embodiments of the present invention and their advantages have been described in detail, it should be understood that various changes, substitutions and alterations may be made herein without departing from the scope of the invention.

What is claimed is:

1. A Bluetooth communication method for establishing a second Bluetooth communication link between a Bluetooth device and a second terminal after a first Bluetooth communication link has been established between the Bluetooth device and a first terminal, the second terminal having a same device information as the first terminal, comprising:
   establishing, by the first terminal using a pairing process, the first Bluetooth communication link between the Bluetooth device and the first terminal;
   receiving, by a receiving unit in a central communication server, communication information concerning the first Bluetooth link from the first terminal when the first terminal and a Bluetooth device are paired;
   transmitting, by a transmitting unit in the central communication server, the communication information to the second terminal; and
   establishing, by the second terminal, the second Bluetooth link between the second terminal and the Bluetooth device, without the pairing process, on the basis of the communication information transmitted by the central communication server to the second terminal.

2. The Bluetooth communication method of claim 1, wherein the communication information includes a link key and a Bluetooth address.

3. The Bluetooth communication method of claim 1, wherein the pairing between the first terminal and the Bluetooth device includes
   requesting, by the first terminal, pairing from the Bluetooth device,
   receiving, by the first terminal, personal identification information from the Bluetooth device, and
   generating, by the first terminal, a link key using a Bluetooth address.

4. The Bluetooth communication method of claim 1, wherein the device information includes a Bluetooth address of the first terminal and a product name.

5. The Bluetooth communication method of claim 1, wherein the device information is divided in accordance with at least one of a sales group and a local group.

6. The Bluetooth communication method of claim 1, wherein the first terminal and the second terminal are at least one of a terminal of an affiliated store and a terminal of a kiosk.

7. The Bluetooth communication method of claim 1, further comprising:
receiving, by the first terminal and the second terminal, advertising data from the central communication server; and
transmitting, by the first terminal and the second terminal, the received advertising data to the Bluetooth device.

8. A Bluetooth communication system comprising:
a Bluetooth device;
a first terminal;
a central communication server that includes a receiving unit for receiving communication information from the first terminal when a first Bluetooth link between the first terminal and the Bluetooth device is established by a pairing process, the central communication server further including a transmitting unit for transmitting the communication information to a second terminal having the same device information as the first terminal, a database for storing the communication information, and a control unit for controlling the receiving unit, the transmitting unit, and the database; and
a second terminal that establishes a communication channel with the Bluetooth device, without the pairing process, on the basis of the communication information transmitted by the central communication server.

9. The Bluetooth communication system of claim 8, wherein the communication information includes a link key and a Bluetooth address.

10. The Bluetooth communication system of claim 8, wherein the first terminal includes a Bluetooth module including
a search unit for searching for the Bluetooth device and requesting the pairing,
a link key generating unit for generating a link key using a Bluetooth address, and
a Bluetooth communication unit for transmitting and receiving data using the Bluetooth device and Bluetooth communication.

11. The Bluetooth communication system of claim 8, wherein the device information includes a Bluetooth address of the first terminal and a product name.

12. The Bluetooth communication system of claim 8, wherein the device information is divided in accordance with at least one of a sales group and a local group.

13. The Bluetooth communication system of claim 8, wherein the first terminal and the second terminal are at least one of a terminal of an affiliated store and a terminal of a kiosk.

14. The Bluetooth communication system of claim 8, wherein the first terminal and the second terminal receive advertising data from the central communication server, and transmit the received advertising data to the Bluetooth device.

* * * * *